[72] Inventors Yoshisada Hayamizu;
Satoru Sakamoto; Nobuo Yamashita,
Tokyo, Japan
[21] Appl. No. 721,248
[22] Filed Apr. 15, 1968
[45] Patented Apr. 27, 1971
[73] Assignee Olympum Optical Co., Ltd.
Tokyo, Japan
[32] Priority Apr. 20, 1967
[33] Japan
[31] 42/24,833

[54] OPTICAL SYSTEM WITH CONTINUOUSLY VARIABLE MAGNIFICATION
5 Claims, 12 Drawing Figs.
[52] U.S. Cl. ................................................. 350/184,
350/96, 350/206
[51] Int. Cl. ................................................. G02b 5/16,
G02b 13/22, G02b 15/14
[50] Field of Search .......................................... 350/96,
184, 175 (TS), 212; 350/40—44, 175 (E), 231

[56] References Cited
UNITED STATES PATENTS
2,662,443 12/1953 Loeck .......................... 350/184X
3,062,100 11/1962 Ludewig et al. ............... 350/255X
2,003,881 6/1935 Grosset et al. ................. 350/(175TS)
3,020,806 2/1962 Castrucci ....................... 350/96X
3,433,559 3/1969 Vockenhuber et al. ......... 350/184X FOREIGN PATENTS
1,425,097 12/1965 France ........................... 350/96

Primary Examiner—John K. Corbin
Attorney—Kurt Kelman

ABSTRACT: An optical system for focusing the image of an object at continuously variable magnification on a surface substantially perpendicular to the optical axis and having two lens elements of positive refractive power axially movable relative to each other to vary the focal length of the system. A stop is fixed in the system relative to the image surface approximately in the midpoint of the range of movement of the front focal point of the two positive elements during relative movement of the same while the image is focused in the surface. The focal lengths of the two positive elements satisfy the relationship $0.6\,f_1 < f_2 < 3\,f_1$ unless a negative lens element is located in front of the two positive lens elements in a fixed axial relationship of the rear focal point of the negative element to the aforementioned front focal point. In this arrangement, the focal lengths of the two positive elements need satisfy only the relationship $0.6f_1 < f_2 < 8f_1$.

OPTICAL SYSTEM WITH CONTINUOUSLY VARIABLE MAGNIFICATION

The system is used as a variable-magnification objective in an endoscope provided with an image transmitting system constituted by optical fibers whose image receiving ends are located in the aforementioned surface. The exit pupil of the objective is farther from the surface in a direction away from the objective than the effective focal length of the objective.

The present invention relates to an optical system of continuously variable magnification and more particularly to a system which can be used with an elongated image transmitting system having a very small diameter such as a fiber optical system.

The present invention is particularly useful in an endoscope which is provided with a fiber optical system.

In an optical system of the prior art an objective lens is located in front of an elongated image transmitting system such as a fiber optical system and the image transmitted to the rear end surface of the image transmitting optical system is viewed through an ocular. The focal length of the objective lens must be continuously varied, if it is desired to continuously vary the size of the image of an object located at a fixed distance from the forward end surface of the image transmitting optical system as in a zooming lens system of a movie camera. However, it is essential to reduce the number of the lens elements constituting the zooming lens system and to make the magnification varying mechanism thereof as small as possible, in order to permit the system to be incorporated in an endoscope and the zooming lens system of the prior art cannot be incorporated in the endoscope because of the complicated construction and the large size of the zooming lens system.

The present invention provides a novel and useful continuously variable magnification optical system which can be used in an endoscope.

Figure 1:
FIG. 1 is a schematic view of the prior art fiber optical system provided with an objective lens.

Referring to FIG. 1, an objective lens OL is located in front of the forward end surface of an elongated image transmitting optical system I such as a fiber optical system at a distance therefrom. The image of an object located in front of objective lens OL is focused on the forward end surface of fiber optical system I. The image focused on the forward end surface of fiber optical system I is transmitted through fiber optical system I to the rear end surface thereof to form image I' thereon.

In a continuously variable magnification optical system i.e. a variable focal length optical system, the entire optical system is constituted by several lens elements or lens groups, and the focal length of the optical system can be varied by varying the air gap(s) between the particularly selected lens components. However, when the image receiving surface which faces the objective lens is constituted by a fiber optical system, it is necessary to direct the chief ray from the objective lens to the image receiving surface substantially at right angles. Therefore, the exit pupil of the objective lens must be located at a greater distance remote from the focal plane of the objective lens in comparison with the focal length of the entire optical system. When the focal length of the entire optical system is to be varied by varying the distance(s) between the lens elements or lens groups, a mechanically complicated system is required for shifting the position of the stop which satisfies the above-described condition, that is, the stop which is located at a position adjacent to the front focal point of a part of the entire optical system which is located behind said stop, along the optical axis of the entire optical system. Therefore, it is desired to reduce the variation in the distance between the rear focal point and the above-described stop. In other words, it is desired to reduce the range of shifting the position of the focal plane of the optical system when the focal length of the optical system is varied.

Figure 2:
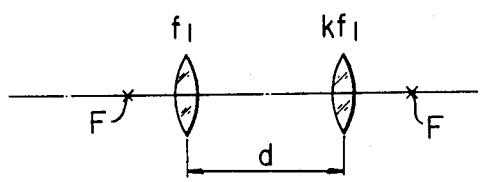
FIG. 2 is a schematic view showing the principle of a well known continuously variable magnification optical system.

As shown in FIG. 2, when two thin lenses having focal lengths $f_1$, $kf_1$, respectively, are located at a distance $df_1$ from each other, the focal length $f$ of the optical system and the distance $\overline{FF'}$ between the front focal point and the rear focal point of the entire optical system are:

$$f = \frac{k}{(k+1-d)} f_1 \qquad (1)$$

$$\overline{FF'} = \frac{2k-d^2}{(k+1-d)} f_1 \qquad (2)$$

Therefore, the focal length $f$ of the optical system can be varied by varying the distance $d$ between the two thin lenses.

Figure 3:
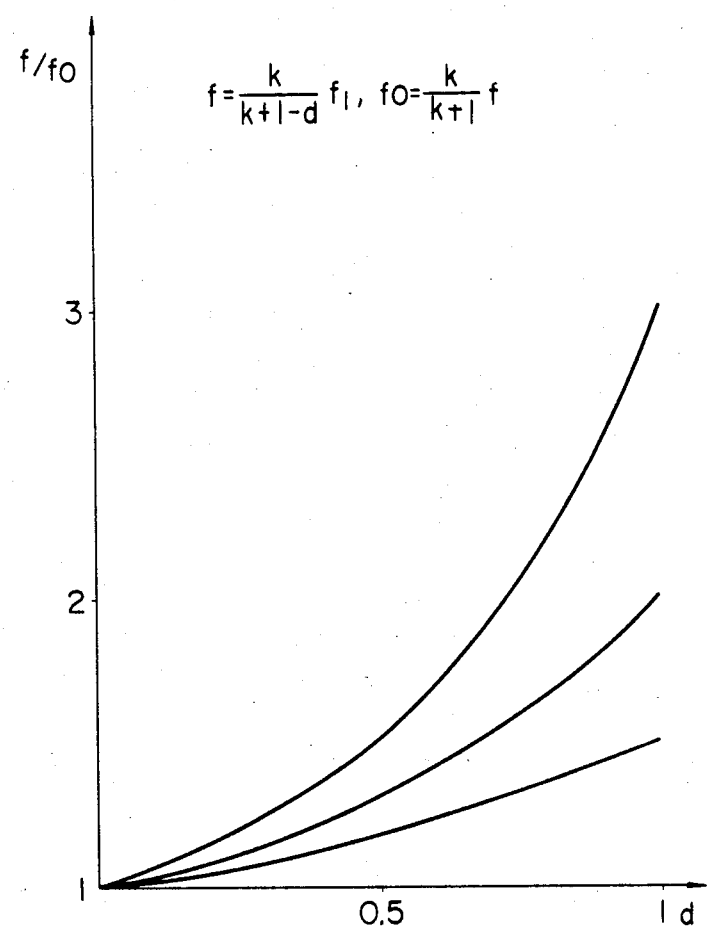
FIGS. 3 and 4 are diagrams each showing the variation in the value $f$ with respect to the value $d$ in the optical system shown in FIG. 2.
Figure 4:
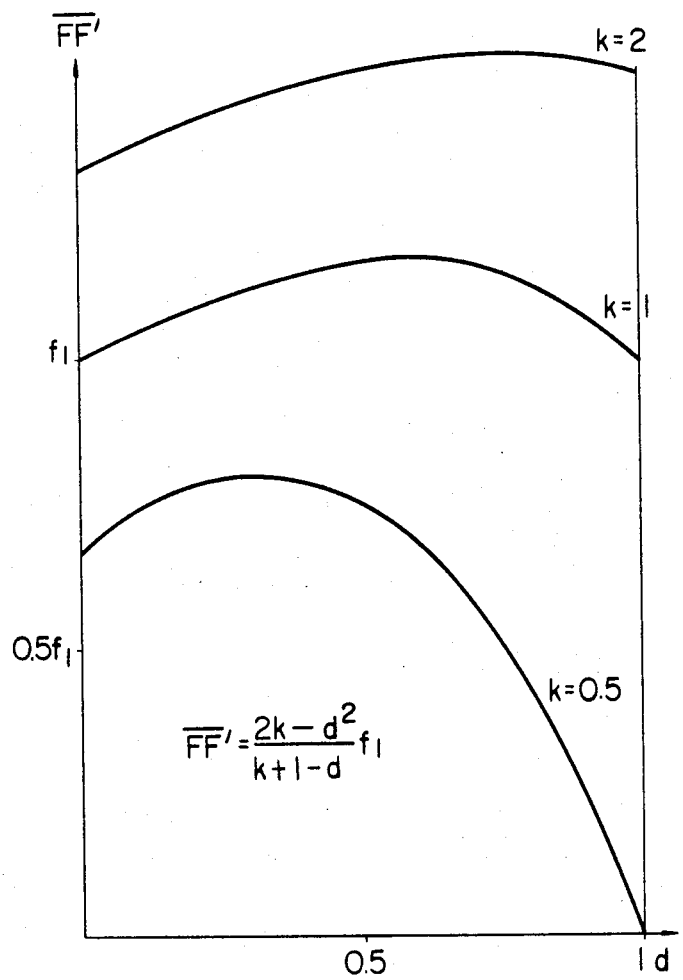

FIGS. 3 and 4 show the rate of variation in $f$ with respect to $k$ that is $f/f_o$ ($f_o$ is the focal length of the entire optical system when $d=0$) and the variation in the value $\overline{FF'}$ with respect to $k$, respectively.

The range in which $d$ can be varied is $d>0$, and the value of $d$ is limited by the fact that F, F' cannot be located in the ranges in which said two lenses are located, respectively. Referring to FIGS. 3 and 4 with the above facts being taken into consideration, the maximum value of $f$ can be obtained when $k=1$ while the minimum variation in the value of $\overline{FF'}$ is maintained. The value of $k$ is not necessary to be precisely equal to 1. In consideration of the practically allowable movement of the exit pupil of the objective lens, the value of $k$ should be between 0.6 and 3 to achieve the object of the present invention.

Figure 5A:
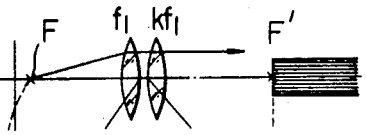
FIG. 5A and FIG. 5B shows an embodiment of the present invention in respective positions.
Figure 5B:
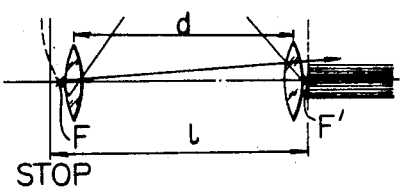

Therefore, it is possible to vary the focal length of the entire optical system as described above by varying the relative distance between two positive lens elements or lens groups each having substantially the same focal length, while the variation in the distance between the stop so located that the exit pupil of the entire optical system is positioned remote from the image receiving surface and the image receiving surface is limited to the minimum. As shown in FIG. 5, whose two parts 5A and 5B illustrate the principle of the present invention, the stop may be located at substantially the midpoint of the range in which the value $\overline{FF'}$ can be varied by allowable changes in the value of $d$, and at a fixed distance from the image receiving surface, while the exit pupil is sufficiently remote from the image receiving surface, when the focal length of the entire optical system is varied.

As described above, the present invention provides an optical system capable of focusing images of the object on an image receiving surface at varying magnification while the distance between the stop of the system and the image receiving surface is kept substantially constant, said optical system having fewer lens elements and a simple mechanism for varying the magnification.

Figure 6A:
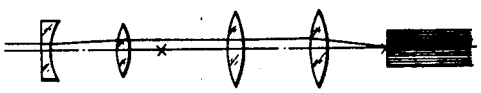
FIG. 6A and FIG. 6B are views similar to FIG. 5 but showing another embodiment of the present invention.
Figure 6B:
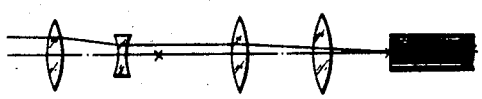

In the above-described optical system, the upper and the lower limits of the focal length $f$ of the entire system are automatically determined, when the focal length $f_1$ of one lens element is determined. However, in accordance with one feature of the present invention, an afocal optical system having the magnifying power of $\beta$ may be interposed on the optical axis between the object and the stop as shown in FIGS. 6A and 6B so that the upper and the lower limits of focal length $f$ of the entire optical system are magnified $\beta$ times thereby permitting the operative range of the optical system to be widened. And further, this arrangement has the advantage that the exit pupil can be located substantially at infinity.

Figure 7A:
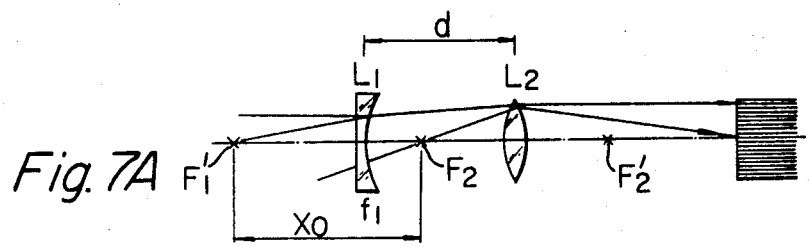
FIG. 7A and FIG. 7B are schematic views of another optical system of continuously variable magnification in two positions.
Figure 7B:
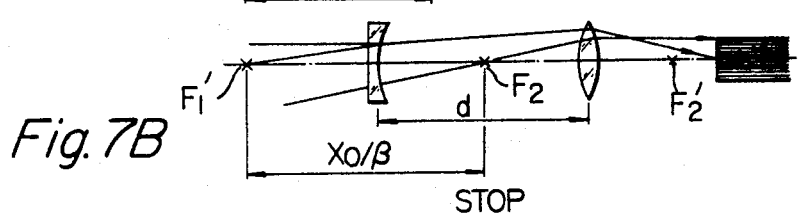

FIG. 7A and FIG. 7B shows a known simple variable magnification optical system, in which a positive lens element is located behind a negative lens element or lens group, so that the image of an object is focused on the image receiving surface located behind said positive lens element at a distance therefrom, and the distance between said two lens elements can be varied thereby permitting the focal length of the entire optical system to be varied.

In the case, the stop is located at the front focal point $F_2$ of the positive lens element $L_2$ to satisfy the requirement that the exit pupil be remote from the image receiving surface and said front focal point $F_2$ is always positioned between the negative lens element $L_1$ and positive lens element.

Assuming that the focal length of said negative lens element $L_1$ is $f_1$ and that of said positive lens element $L_2$ is $f_2$ and that the rear focal point of said negative lens element $L_1$ is $F_1'$ and the front and rear focal points of said positive lens element $L_2$ are $F_2$, $F_2'$, respectively, and that the distance between said lens elements $d$, then the focal length $f$ on the entire optical system is $$f = f_1 \times \frac{f_2}{-\overrightarrow{F_1'F_2}}$$

Therefore, assuming that the focal length $f$ of the entire optical system is $fo$ when $\overrightarrow{F_1'F_2} = xo$ it is necessary to make $$\overrightarrow{F_1'F_2} = \frac{xo}{\beta}$$

if the focal length $fo$ should be changed to $\beta fo$.

When the front focal point $F_2$ must be positioned at the side of said negative lens element $L_1$ remote from the object, the minimum value of $|F_1' F_2|$ is $|f_1|$. Therefore, when $\beta$ is selected to be 0.5, for example, then said positive lens element $L_2$ must be shifted by $|f1|$ from the initial condition of $|F_1' F_2| = |f_1|$ in the direction in which said distance $d$ is increased.

Therefore, when the focal length $f_1$ of the negative lens element $L_1$ is small, the amount of said positive lens element $L_2$ can be reduced to achieve the above-described effect. However, it is not desirable to make the power of said negative lens element $L_1$ too high, because the aberration of the optical system is increased thereby and the construction of the optical system is complicated by the need for correcting the aberration of the optical system.

The focal plane of the entire optical system is shifted a distance which is movement of the sum of the movement of the positive lens element or lens group $L_2$ i.e.

$$\frac{(1-\beta)}{\beta} xo$$

and the value $$f_2{}^2 \left( \frac{1-\beta}{xo} \right)$$

therefore the sum exceeds the movement of said positive lens element $L_2$, thereby making the variation in the distance from the forward end of the entire optical system to the focal plane thereof too great. This is not practical.

Figure 8A:
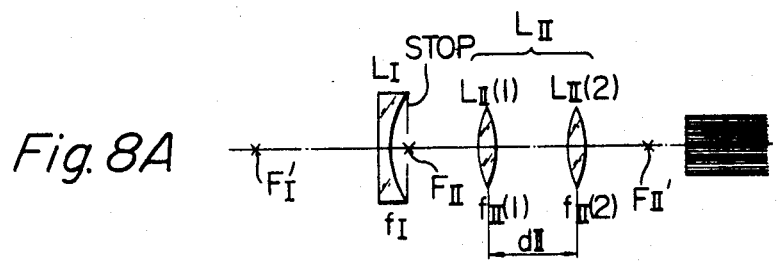
FIG. 8A and FIG. 8B are views similar to FIG. 5A and FIG. 5B but showing still another embodiment of the present invention.
Figure 8B:
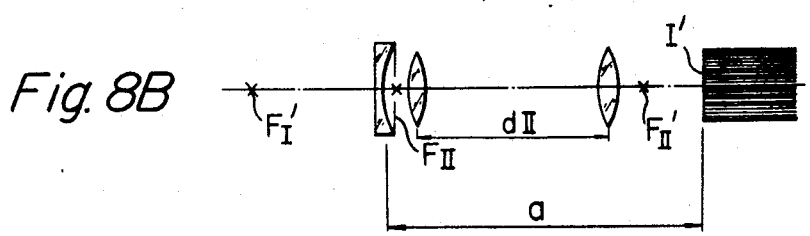

In the present invention, as shown in FIG. 8, positive lens element $L_2$ shown in FIG. 7 is replaced by a positive lens system $L_{II}$ comprising two positive lens elements or lens groups $L_{II(1)}$ and $L_{II(2)}$ of respective focal lengths $f_{II(1)}$ and $f_{II(2)}$. When the distance between said two positive lens elements or lens groups $L_{II(1)}$ and $L_{II(2)}$ is varied in such a manner that the relative position of the front focal point $F_{II}$ of said positive lens system $L_{II}$ with respect to said negative lens element on lens group $L_1$ is fixed, then the focal length $f$ of the entire optical system is magnified by $\beta$ times when the focal length of said positive lens system $L_{II}$ is magnitude by $\beta$ times, because the distance between the rear focal point $F_1'$ of negative lens element or lens group $L_1$ and the front focal point $F_{II}$ of the positive lens system $L_{II}$ is kept constant although the focal length of said positive lens system $L_{II}$ is varied.

Since the focal plane of the entire optical system is always shifted rearwardly beyond the rear focal point $F_{II}'$ of the positive lens system $L_{II}$, the upper limit of the distance $d_{II}$ between the positive lens elements or lens groups $L_{II(1)}$ and $L_{II(2)}$ which is allowable without the focal plane of the entire optical system entering the lens elements can be made greater than without the negative lens element or lens group $L_1$, that is, the optical system is constituted only by the positive lens system $L_{II}$.

The focal length $f$ of the entire optical system consisting of the negative lens element or lens group $L_1$ and two positive lens elements or lens groups $L_{II(1)}$, $L_{II(2)}$ which constitute positive lens system $L_{II}$ is defined by the equation $$f = f_1 \times \frac{f_{II}}{-\overrightarrow{F_1'F_{II}}}$$

Therefore, the fact that the variation in the focal length $f_{II}$ can be made greater by the present invention permits the variation in the focal length $f$ of the entire optical system to be made greater. In this case, the power of negative lens element or lens group $L_1$ is not necessarily high.

It is also possible to vary the upper and lower limits of the focal length $f$ of the entire optical system by varying the position of said positive lens system $L_{II}$ with respect to said negative lens element or lens group $L_1$, while the ratio of variation in the focal length $f$ of the entire optical system is kept constant. Since the value $\overrightarrow{F_1'F_{II}}$ is fixed, the front focal point $F_{II}$ of said positive lens system $L_{II}$ enters the position of the negative lens element or lens group $L_1$ or is shifted beyond the negative lens element or lens group $L_1$, however, this is permitted in the optical system of the present invention. Therefore, the distance between the forward positive lens element or lens group $L_{II(1)}$ and negative lens element or lens group $L_1$ can be made extremely small insofar as the mechanical construction of the optical system permits. This is one of the characteristic features of the present invention.

Assuming now that the focal length of the negative lens element or lens group $L_1$ is $-pf_{II(1)}'$ and the focal length $f_{II(2)}$ of the positive lens element or lens group $L_{II(2)}$ is represented by $kf_{II(1)}'$ $f_{II(1)}$ being the focal length of the positive lens element or lens group $L_{II(1)}'$ and that the distance between the positive lens elements or lens groups $L_{II(1)}$ and $L_{II(2)}$ is $df_{II(1)}$ then distance $af_{II(1)}$ from the front focal point $F_{II}$ of the positive lens system $L_{II}$ to the focal plane $I'$ is represented by the following relationship.

$$a = \frac{2k - d^2}{(k+1-d)} + \frac{k^2}{p(k+1-d)^2} \quad (3)$$

The condition that the focal plane $I'$ does not enter the range of the positive lens element or lens group $L_{II(2)}$, when $d$ is varied from 0 to $k$, is expressed by the following relationship.

$$p < \frac{k}{(k-1)} \quad (4)$$

Since values of $p$ and $k$ are positive, the value of $k$ must be greater than 1 if $d$ is to be varied under conditions in which the front focal point $F_{II}$ of the positive lens system $L_{II}$ is prevented from entering the range of the positive lens element or lens group $L_{II(1)}$, at the same time, the focal plane $I'$ is prevented from entering the range of the positive lens element or lens group $L_{II(2)}$ when the ratio of variation in the focal length of the entire optical system may be held small, that is, when the value of $d$ is not varied to approach the above upper limit, the lower limit of $k$ may be practically 0.6 in consideration of the allowable shifting of the exit pupil.

If $a$ in the equation (3) is $a_o$ and $a_k$, when $d=o$ and $d=k$, respectively, then the value of $k$, by which the value $a_o-a_k$ is reduced to the minimum, that is, the variation in the distance the from front focal point $F_{II}$ of the positive lens system $L_{II}$ to the focal plane $I'$ is reduced to the minimum at the upper and lower limits of the variation in the focal length of the positive lens system $L_{II}$, respectively, is determined in terms of the value of $p$.

When the value of $p$ is selected to be $p=3$, for example, then the value of $a_o-a_k$ is reduced to a minimum when $k$ 1.5. The value of $k$ which satisfies the above condition approaches 1 when the value of $p$ is increased, while the above value of $k$ increases to a value greater than 1 when the value of $p$ is decreased. However, if the value of $k$ becomes too great, the range over which the distance $df_{II(1)}$ between two convex lens elements or lens groups $L_{II(1)}$ and $L_{II(2)}$ is varied in order to obtain the desired ratio of variation in the focal length, i.e. the magnification ratio of the optical system, becomes too great. This is not desirable. Therefore, the upper limit of the value of $k$ is practically 8.

As described above, by providing a lens element or lens group having negative refractive power in front of the optical system in which two positive lens elements or lens groups are arranged in series so as to permit the focal length of the optical system comprised of said two positive lens elements or lens groups to be varied, the ratio of variation in the focal length can be increased and, at the same time, the power of said negative lens element or lens group is not necessarily required to be high, thereby permitting the aberration of the optical system to be advantageously compensated for.

In the above description, each of the lens elements or lens groups is described as being comprised of thin lenses, however, it is evident that thick lenses or cemented compound lens elements can be as lens components used in the objective of this invention.

The present invention is not to be limited to the embodiment as described above and shown in the drawings, but it must be understood that the present invention includes the broad concept of the present invention.

We claim:

1. In an optical system having an axis and including objective means for focusing an image of an object at continuously variable magnification on a surface substantially perpendicular to said axis, the objective means including two lens components having positive refractive power and respective focal lengths $f_1, f_2$, said components being axially movable relative to each other, and the effective focal length of said objective means being varied by the relative movement of said components, the improvement which comprises:
   a. a stop at a substantially fixed position relative to said surface and substantially in the midpoint of the range of movement of the front focal point of said two components during said relative movement while said image is focused in said surface.
   b. said stop and said components defining an exit pupil of said objective means spaced from said surface in a direction away from said objective means a distance greater than the effective focal length of said components during said relative moment, said surface being a plane; and
   c. a plurality of optical fibers jointly constituting an image transmitting system and an image receiving end surface of said image transmitting system, said end surface extending in said plane.

2. In a system as set forth in claim 1, said focal lengths $f_1, f_2$ satisfying the relationship
$0.6 f_1 f_2 < 3 f_1$.

3. In a system as set forth in claim 1, a further lens component having negative refractive power coaxially located in front of said two components, the rear focal point of said further lens component being in a fixed position relative to said front focal point of said two components.

4. In a system as set forth in claim 1, said focal lengths $f_1, f_2$ satisfying the relationship
$0.6 f_1 f_2 < 8 f_1$.

5. In a system as set forth in claim 1, said focal lengths $f_1, f_2$ being substantially equal.